United States Patent [19]

Brand et al.

[11] Patent Number: 5,700,318
[45] Date of Patent: Dec. 23, 1997

[54] DURABLE PIGMENTS FOR PLASTIC

[75] Inventors: John R. Brand, Oklahoma City; Kelly A. Green, Edmond, both of Okla.

[73] Assignee: Kerr-McGee Chemical Corporation, Oklahoma City, Okla.

[21] Appl. No.: 632,993

[22] Filed: Apr. 16, 1996

[51] Int. Cl.$^6$ ................................................. C09C 1/36
[52] U.S. Cl. .................... 106/442; 106/426; 106/459; 106/474; 427/214; 428/403
[58] Field of Search .................... 106/442, 426, 106/459, 474; 427/214; 428/403

[56] References Cited

U.S. PATENT DOCUMENTS

| | | | |
|---|---|---|---|
| 3,770,470 | 11/1973 | Swank | 106/442 |
| 4,022,636 | 5/1977 | Murray | 106/442 |
| 4,075,032 | 2/1978 | Thomas | 106/441 |
| 4,416,699 | 11/1983 | Jacobson | 106/443 |

*Primary Examiner*—Mark L. Bell
*Assistant Examiner*—Scott L. Hertzog
*Attorney, Agent, or Firm*—Herbert M. Hanegan; J. Rodgers Lunsford, III

[57] ABSTRACT

Improved alumina-coated inorganic pigments having a first coating of boehmite alumina, a second coating of amorphous alumina, and a third coating of boehmite alumina which exhibit good durability, dispersibility, and optical properties in plastic compositions are disclosed. Also disclosed is a process whereby an aqueous slurry of an alumina-containing inorganic pigment is milled to achieve a particular particle size distribution, a first coating of boehmite alumina is precipitated onto the pigment material within a first pH range, a second amount of an alumina coating agent is added to the aqueous slurry within a second pH range to obtain a second coating of amorphous alumina over the first boehmite alumina coating, and then the pH of the slurry is adjusted to a third pH range thus forming a third boehmite alumina coating over the second amorphous alumina coating.

48 Claims, No Drawings

DURABLE PIGMENTS FOR PLASTIC

BACKGROUND OF THE INVENTION

1. Field of the Invention

The present invention relates to improved alumina-coated inorganic pigments and a method for multi-coating alumina-containing inorganic pigments to achieve good durability, low photochemical and chemical reactivity, and good optical and dispersibility properties in plastic applications. Most specifically, the present invention relates to an improved alumina-containing titanium dioxide pigment having a first coating of boehmite alumina, a second coating of amorphous alumina over the first boehmite alumina coating, and a third coating of boehmite alumina over the second amorphous alumina coating.

2. Description of the Prior Art

The surface treatment and coating of inorganic pigments, such as titanium dioxide for example, to achieve improved performance characteristics in plastic compositions, is known in the art. Dispersibility, processibility and good optical properties are typically achieved through surface treatment of the pigment, whereas durability and low chemical and photochemical reactivity is typically obtained by coating the pigment with silica, alumina, and other metal oxide coatings. When precipitated using prior art practices, these metal oxide coatings tend to make the pigments more difficult to disperse in plastics. Also, pigments coated with metal oxides tend to have more adsorbed water which may cause out-gassing and lensing problems in production of plastics with coated pigments. Typically, these problems have not been solved with a single pigment. Thus, plastics compounders have generally had to choose between durability, which can be achieved with coated pigments, and dispersibility, processibility and good optical properties, which can be achieved with treated and untreated pigments.

For example, U.S. Pat. No. 3,523,810 discloses a process for coating titania pigments with from 0.5 percent to 10 percent boehmite alumina at a pH of from 7 to 9 at temperatures between 70° and 100° C. A pigment of this type with only boehmite and no amorphous alumina may have good optical and dispersibility properties but does not achieve good durability. Similarly, U.S. Pat. No. 4,022,636 describes the addition of two coatings of alumina to titanium dioxide pigments, one amorphous coating at a pH of about 2 followed by a boehmite coating at a pH of about 8, to achieve a pigment with good performance in plastics. However, this process lacks the elements required to form the dense alumina required for the manufacture of durable plastics. Also, U.S. Pat. No. 4,416,699 describes a method for coating a pigment with between 2 percent and 6 percent alumina to achieve the chalk-fade resistance, gloss, and dispersibility required for paint grades of titanium dioxide. However, this process contains higher alumina levels than are permissible for optimum performance of titanium dioxide pigments in plastic applications.

Examples of inorganic pigment coating processes to which improved performance benefits have been ascribed include the coating process disclosed in U.S. Pat. No. 2,671,031. This patent teaches the precipitation of a hydrous aluminum oxide coating upon titanium dioxide followed by heat treatment between 500° C. and 800° C. to decrease pigment chalking. The present invention does not involve such a heating process. U.S. Pat. No. 2,780,558 discloses a process for coating pigmentary materials with alumina added as an alcoholate compound. The present invention involves multiple coatings of alumina added as an inorganic salt. In U.S. Pat. No. 3,146,119 the claimed process requires the precipitation of a layer of titanium dioxide onto the pigment prior to the precipitation of an alumina layer. The present invention does not require a titanium dioxide coating. U.S. Pat. No. 3,409,454 discloses an alumina-coated titanium dioxide pigment and process for obtaining the same wherein the alumina is precipitated onto the pigment under alkaline conditions (pH greater than 10) for improved pigment dispersibility in plastics. The present invention involves an acidic coating procedure and digestion followed by an alkaline coating step. U.S. Pat. No. 3,529,985 discloses a double coated titanium dioxide pigment wherein the first metal oxide coating is calcined at a temperature of at least 450° C. before addition of the second coating for improved durability and optical properties. The present invention does not require a calcination step. U.S. Pat. No. 3,853,575 discloses the production of alumina-coated titanium dioxide pigments wherein the alumina coating is supplied by the addition of an alkaline alumina salt to an aqueous titanium dioxide solution. The present invention discloses an acidic alumina coating procedure and digestion followed by an alkaline coating step. U.S. Pat. No. 4,239,548 discloses a titanium dioxide pigment with improved photochemical stability achieved by a first coating of cerium and phosphate radicals onto the pigment and a second coating of aluminum and phosphate radicals over the first coating. The present invention does not involve the use of cerium. U.S. Pat. No. 5,114,486 discloses a process for coating titanium dioxide pigments with zinc, phosphate, and aluminum ions for improved processibility. The present invention does not involve the use of zinc.

None of the aforementioned patents suggest or teach the coating of inorganic pigments with a first layer of boehmite alumina, a second layer of amorphous alumina, and a third layer of boehmite alumina to produce the coated pigments which are the subject of this application.

SUMMARY OF THE INVENTION

An object of the present invention is to provide durable alumina-coated inorganic pigments with good optical properties, dispersibility, and chemical stability in plastics applications. A further object is to provide improved inorganic pigments, preferably titanium dioxide pigments, having deposited thereon a first coating of boehmite alumina, a second coating of amorphous alumina and a third coating of boehmite alumina. An additional object of the present invention is to provide a process by which such alumina-coated inorganic pigments are produced.

DESCRIPTION OF THE PREFERRED EMBODIMENTS

The present invention relates to an alumina-coated inorganic pigment comprising an inorganic pigment material containing at least about 0.75 percent alumina by weight based upon the weight of said pigment material, having a first coating of predominantly boehmite alumina on said inorganic pigment, a second coating of predominantly amorphous alumina over said first coating, and a third coating of predominantly boehmite alumina over said second coating; said first coating being achieved in a discrete interval and said second and third coatings being achieved continuously.

Advantageously, the alumina-coated inorganic pigment contains from about 0.75 percent to about 2 percent alumina by weight based upon the weight of said pigment. Preferably the alumina-coated inorganic pigment contains from about 1 percent to about 1.5 percent alumina by weight based upon the weight of said pigment material and most preferably the alumina coated inorganic pigment contains about 1.3 percent alumina by weight based upon the weight of said pigment material.

Advantageously the alumina-coated inorganic pigment employed is titanium dioxide.

The process for preparing the alumina-coated inorganic pigments of the present invention advantageously comprises the steps of:

(a) milling an aqueous slurry containing inorganic pigment material, wherein said pigment material contains at least about 0.75 percent alumina by weight based upon the weight of said pigment material, in the presence of a dispersing agent, to achieve a particle size distribution in said pigment wherein no more than about 40 percent of said pigment particles are greater than 0.49 microns as measured by a Microtrac 9200 FRA;

(b) removing the milling media from said aqueous slurry;

(c) adding a first aamount of an alumina coating agent to said slurry advantageously along with a second amount of a dispersing agent and adjusting the slurry pH to a level of at least about 1.5 to form a first coating of predominately boehmite alumina on said pigment;

(d) digesting the slurry at a temperature of from about 50° C. to about 70° C. for a time of from about 5 to about 60 minutes;

(e) increasing the pH of the slurry to a level within the range of from about 3 to about 5;

(f) adding a second aamount of an alumina coating agent to the slurry with concurrent addition of a pH adjusting agent to form a second coating of predominately amorphous alumina over said first coating while maintaining the pH of the slurry within a range of from about 3 to about 5;

(g) digesting the slurry at a temperature of from about 50 ° C. to about 70 ° C. for a time of from about 10 to about 90 minutes;

(h) adjusting the pH of the slurry to a level within the range of from about 7 to about 9 and digesting said slurry at a temperature of from about 50° C. to about 70° C. for a time of from about 5 to about 60 minutes to form a third coating of predominately boehmite alumina over said second coating; and (i) recovering said alumina coated pigment to provide a plastics grade pigment.

Advantageously the pigment material in step (a) contains from about 0.75 percent to about 2.0 percent alumina by weight based upon the weight of said pigment material. Preferably said pigment material in step (a) contains about 1.3 percent alumina by weight based upon the weight of said pigment material. Advantageously said pigment material is titanium dioxide. Advantageously, the dispersing agent in steps (a) and (c) is selected from the group consisting of phosphates, polyols and amines. Preferably the dispersing agent is sodium hexametaphosphate. The dispersing agent in step (a) is advantageously present in an aamount in the range of from about 0.05 percent to about 0.5 percent by weight based upon the weight of said pigment material. Preferably the aamount of said dispersing agent is about 0.15 percent by weight based upon the weight of said pigment material. When a dispersing agent is employed in step (c), it is advantageously present in an amount in the range of from about 0.05 percent to about 0.5 percent by weight based upon the weight of said pigment material. Preferably said dispersing agent is present in step (c) in an amount of about 0.15 percent by weight based upon the weight of said pigment material.

In the present invention from about 0.1 percent to about 20 percent of said pigment particles are 0.49 microns or less as measured by a Microtrac 9200 FRA. Advantageously from about 5 percent to about 10 percent of said pigment particles are 0.49 microns or less and preferably about 7 percent of said pigment particles are 0.49 microns or less.

Advantageously the milling media of step (a) is sand. Preferably the temperature during steps c through h is maintained within a range of from about 50° C. to about 70° C. and most preferably the temperature is maintained at about 60° C.

Advantageously the alumina coating agent is an acidic or alkaline inorganic aluminum salt. Preferably said alumina coating agent is sodium aluminate.

In the present inventive process the aamount of alumina coating agent added in step (c) is sufficient to provide said first coating in an aamount within a range of from about 0.01 percent to about 1 percent boehmite alumina by weight based upon the weight of said pigment material. Advantageously the alumina coating agent added in step (c) is sufficient to provide said first coating in an aamount within a range of from about 0.2 percent to about 0.5 percent and preferably the alumina coating agent added is sufficient to provide said first coating in an aamount of about 0.35 percent by weight.

Advantageously the alumina coating agent added in step (f) is sufficient to provide said second coating in an aamount within a range of from about 0.2 percent to about 1.2 percent by weight based upon the weight of said pigment material. Preferably the alumina coating agent added is sufficient to provide said second coating in an amount within a range of from about 0.5 percent to about 1.0 percent by weight and most preferably the alumina coating agent added is sufficient to provide said second coating in an aamount of about 0.75 percent by weight.

Advantageously the pH of said slurry during step (a) is about 10. The pH of said slurry in step (c) is advantageously adjusted to a level within the range of flora about 1 to about 3 and preferably the pH of said slurry is adjusted to about 1.5. Advantageously the pH of said slurry in step (e) is adjusted to about 3 and the pH of said slurry in step (f) is maintained at about 5.75. The pH of said slurry in step (h) advantageously is adjusted to a level within a range of from about 7 to about 9 and preferably the pH of said slurry is adjusted to about 7.8. Advantageously the pH adjusting agent in steps (c) and (f) is a mineral acid, preferably sulfuric add. Preferably said pH adjusting agent in steps (e) and (h) is an alkali metal hydroxide base. Preferably such pH adjusting agent is sodium hydroxide.

Advantageously said slurry is digested in step (d) from about 5 to about 60 minutes and preferably said slurry is digested for about 15 minutes. Advantageously said slurry is digested in step (g) for from about 10 to about 90 minutes and preferably said slurry is digested for about 30 minutes. Advantageously said slurry is digested in step (h) for from about 5 to about 60 minutes and preferably said slurry is digested for about 15 minutes. Advantageously the alumina coated pigment is recovered by filtering, drying and milling.

EXAMPLE 1

An aqueous solution comprising 1800 g of $TiO_2$ with 1.3% alumina by weight calculated as $Al_2O_3$ was dispersed with 0.15% sodium hexameta phosphate and sand-milled to obtain a particle size distribution of 7% of particles having a size less than 0.49 micron. The sand was removed after milling. The slurry was then diluted to a volume of 4.5 L, an additional 2.54 g calgon was added and the temperature adjusted to 60° C. 11.5 mL, 1.4696 g/mL, alumina was added as sodium aluminate. The pH was adjusted to 3.5 with 5.0 mL sulfuric acid and the solution digested for 15 minutes. The pH of the solution was then adjusted to 5.75 with 5.0 mL sodium hydroxide. 45.8 mL, 1.4696 g/mL, alumina was added as sodium aluminate with concurrent addition of 13.3 mL sulfuric acid to maintain the pH at 5.5–6.0. The slurry was digested for 30 minutes. The pH was then adjusted to 7.8 with 4.3 mL sodium hydroxide and digested an additional 15 minutes. The samples were then faltered, dried and micronized with 0.35% TMP. The results are reported in Table 1.

EXAMPLE 2

The treatment of Example 1 was repeated. Pigment was micronized with 0.40% TMP/0.3% TEA.

Reference 1 was a heavily treated "durable" pigment for plastics.

Reference 2 was an untreated pigment for plastics.

Reference 3 was a standard plastics grade pigment.

TABLE 1

|  | Example 1 | Example 2 | Reference 1 | Reference 2 | Reference 3 |
| --- | --- | --- | --- | --- | --- |
| Optical and Dispersibility Properties | | | | | |
| Tint Strength | 99.8 | 100.7 | 97.5 | 100.1 | 101.8 |
| Brightness | 102.4 | 103.0 | 99.3 | 99.8 | 100.7 |
| Screen Pack (Disp) | 38 | na | 58 | 63 | na |
| Reactivity and Durability Tests* | | | | | |
| Photo-induced Anti-oxidant Yellowing | 4.6 | 3.2 | 4.2 | 12 | 8.5 |
| Durability | 10 | 6.1 | 12 | 29 | 24 |
| Volatiles @ 350C | 0.63 | 0.71 | 1.2 | .37 | .48 |

*Lower numbers indicate lower reactivity in these tests and are therefore preferred.

What is claimed is:

1. An alumina-coated inorganic pigment comprising an inorganic pigment material containing at least about 0.75 percent alumina by weight based upon the weight of said pigment material having a first coating of predominantly boehmite alumina on said inorganic pigment, a second coating of predominantly amorphous alumina over said first coating, and a third coating of predominantly boehmite alumina over said second coating; said first coating being achieved in a discrete interval and said second and third coatings being achieved continuously.

2. The alumina-coated inorganic pigment of claim 1 wherein said inorganic pigment contains from about 0.75 percent to about 2 percent alumina by weight based upon the weight of said pigment.

3. The alumina-coated inorganic pigment of claim 2 wherein said pigment material contains from about 1 percent to about 1.5 percent alumina by weight based upon the weight of said pigment material.

4. The alumina-coated inorganic pigment of claim 3 wherein said pigment material contains about 1.3 percent alumina by weight based upon the weight of said pigment material.

5. The alumina-coated inorganic pigment of claim 1 wherein said pigment material is titanium dioxide containing at least about 0.75 wt % of alumina based on the weight of said pigment material.

6. A process for preparing alumina-coated inorganic pigments comprising the steps of:

(a) milling an aqueous slurry containing inorganic pigment material, wherein said pigment material contains at least about 0.75 percent alumina by weight based upon the weight of said pigment material, in the presence of a dispersing agent, to achieve a particle size distribution in said pigment material wherein no more than about 40 percent of said pigment particles are greater than 0.49 microns as measured by a Microtrac 9200 FRA;

(b) removing the milling media from said aqueous slurry;

(c) adding a first amount of an alumina coating agent to said slurry and adjusting the slurry pH to a level of at least about 1.5 to form a first coating of predominately boehmite alumina on said pigment;

(d) digesting the slurry at a temperature of from about 50° C. to about 70° C. for a time of from about 5 to about 60 minutes;

(e) increasing the pH of the slurry to a level within the range of from about 2.5 to about 5;

(f) adding a second aamount of an alumina coating agent to the slurry with concurrent addition of a pH adjusting agent to form a second coating of predominately amorphous alumina over said first coating while maintaining the pH of the slurry within a range of from about 5 to about 7;

(g) digesting the slurry at a temperature of from about 50° C. to about 70° C. for a time of from about 10 to about 90 minutes;

(h) adjusting the pH of the slurry to a level within the range of from about 6 to about 9 and digesting said slurry at a temperature of from about 50° C. to about 70° C. for a time of from about 5 to about 60 minutes to form a third coating of predominately boehmite alumina on said pigment and over said second coating;

(i) recovering said alumina coated pigment to provide a plastics grade pigment.

7. The process of claim 6 wherein said pigment material in step (a) contains from about 1 percent to about 1.5 percent alumina by weight based upon the weight of said pigment material.

8. The process of claim 7 wherein said pigment material contains about 1.3 percent alumina by weight based upon the weight of said pigment material.

9. The process of claim 6 wherein said pigment material is titanium dioxide containing at least about 0.75 wt % alumina based on the weight of said pigment material.

10. The process of claim 6 wherein a second aamount of a dispersing agent is added in step (c).

11. The process of claim 10 wherein said dispersing agent in steps (a) and (c) is selected from the group consisting of phosphates, polyols and amines.

12. The process of claim 11 wherein said dispersing agent is sodium hexametaphosphate.

13. The process of claim 6 wherein said dispersing agent in step (a) is present in an aamount in the range of from about 0.05 percent to about 0.50 percent by weight based upon the weight of said pigment material.

14. The process of claim 13 wherein the aamount of said dispersing agent is about 0.15 percent by weight based upon the weight of said pigment material.

15. The process of claim 10 wherein said dispersing agent in step (c) is present in an aamount in the range of from about 0.05 percent to about 0.50 percent by weight based upon the weight of said pigment material.

16. The process of claim 15 wherein said dispersing agent is present in an aamount of about 0.30 percent by weight based upon the weight of said pigment material.

17. The process of claim 6 wherein from about 0.1 percent to about 20 percent of said pigment particles are 0.49 microns or less as measured by a Microtrac 9200 FRA.

18. The process of claim 17 wherein from about 5 percent to about 10 percent of said pigment particles are 0.49 microns or less.

19. The process of claim 18 wherein no more than about 7 percent of said pigment particles are 0.49 microns or less.

20. The process of claim 6 wherein the milling media of step (a) is sand.

21. The process of claim 6 wherein the temperature during steps c through h is maintained within the range of from about 50° C. to about 70° C.

22. The process of claim 21 wherein the temperature is maintained at about 60° C.

23. The process of claim 6 wherein the alumina coating agent is an acidic or alkaline inorganic aluminum salt.

24. The process of claim 23 wherein said alumina coating agent is sodium aluminate.

25. The process of claim 6 wherein the amount of alumina coating agent added in step (c) is sufficient to provide said first coating in an amount within the range of from about 0.01 percent to about 1 percent boehmite alumina by weight based upon the weight of said pigment material.

26. The process of claim 25 wherein the alumina coating agent added in step (c) is sufficient to provide said first coating in an amount within the range of from about 0.2 percent to about 0.5 percent by weight based upon the weight of said pigment material.

27. The process of claim 26 wherein the alumina coating agent added is sufficient to provide said first coating in an amount of about 0.35 percent by weight based upon the weight of said pigment material.

28. The process of claim 6 wherein the alumina coating agent added in step (f) is sufficient to provide said second coating in an amount within a range of from about 0.2 percent to about 1.2 percent by weight based upon the weight of said pigment material.

29. The process of claim 28 wherein the alumina coating agent added is sufficient to provide said second coating in an aamount within a range of from about 0.5 percent to about 1.0 percent by weight based upon the weight of said pigment material.

30. The process of claim 29 wherein the alumina coating agent added is sufficient to provide said second coating in an aamount of about 0.75 percent by weight based upon the weight of said pigment material.

31. The process of claim 6 wherein the pH of said slurry during step (a) is about 10.

32. The process of claim 6 wherein the pH of said slurry in step (c) is adjusted to a level within the range of from about 1 to about 3.

33. The process of claim 32 wherein the pit of said slurry is adjusted to a level of about 1.5.

34. The process of claim 6 wherein the pH of said slurry in step (e) is adjusted to about 3.

35. The process of claim 6 wherein the pH of said slurry in step (f) is maintained at about 5.75.

36. The process of claim 6 wherein the pH of said slurry in step (h) is adjusted to a level within the range of from about 7 to about 9.

37. The process of claim 36 wherein the pH of said slurry is adjusted to about 8.

38. The process of claim 6 wherein the pH adjusting agent in steps (c) and (f) is a mineral acid.

39. The process of claim 38 wherein said pH adjusting agent is sulfuric acid.

40. The process of claim 6 wherein the pH adjusting agent in steps (e) and (h) is an alkali metal hydroxide base.

41. The process of claim 40 wherein said pH adjusting agent is sodium hydroxide.

42. The process of claim 6 wherein said slurry is digested in step (d) for from about 10 to about 45 minutes.

43. The process of claim 42 wherein said slurry is digested for about 15 minutes.

44. The process of claim 6 wherein said slurry is digested in step (g) for from about 20 to about 70 minutes.

45. The process of claim 44 wherein said slurry is digested for about 30 minutes.

46. The process of claim 6 wherein said slurry is digested in step (h) for from about 10 to about 45 minutes.

47. The process of claim 46 wherein said slurry is digested for about 15 minutes.

48. The process of claim 6 wherein said alumina coated pigment is recovered by filtering, drying and milling.

* * * * *

UNITED STATES PATENT AND TRADEMARK OFFICE
CERTIFICATE OF CORRECTION

Patent No.:     5,700,318

Dated:          December 23, 1997

Inventor(s):    John R. Brand and Kelly A. Green

It is certified that an error appears in the above-identified patent and that said Letters Patent is hereby corrected as shown below:

```
    Column 3, line 29, delete "3" and substitute
--2.5-- therefor;

Column 3, line 34, delete "3" and substitute --5--
therefor;

Column 3, line 35, delete "5" and substitute --7--
therefor;

Column 3, line 40, delete "7" and substitute --6--
therefor; and

Column 8, line 10, (line 1 of claim 33) delete
"pit" and substitute --pH-- therefor.
```

Signed and Sealed this

Twenty-seventh Day of July, 1999

Attest:

Q. TODD DICKINSON

*Attesting Officer*       *Acting Commissioner of Patents and Trademarks*